US 7,653,398 B2

(12) United States Patent
Buckley et al.

(10) Patent No.: US 7,653,398 B2
(45) Date of Patent: Jan. 26, 2010

(54) GEOGRAPHICAL NETWORK INITIATED WIRELESS DEVICE FEATURE CONTROL

(75) Inventors: Adrian Buckley, Tracy, CA (US); Khaled Islam, Ottawa (CA); Nicholas Alfano, Stratford-Upon-Avon (GB); Luis Estable, Ottawa (CA); Trevor Plestid, Ottawa (CA)

(73) Assignee: Research in Motion Limited, Waterloo (CA)

( * ) Notice: Subject to any disclaimer, the term of this patent is extended or adjusted under 35 U.S.C. 154(b) by 296 days.

(21) Appl. No.: 11/252,726

(22) Filed: Oct. 19, 2005

(65) Prior Publication Data

US 2007/0087764 A1    Apr. 19, 2007

(51) Int. Cl.
*H04W 24/00* (2009.01)
*H04M 3/00* (2006.01)
(52) U.S. Cl. .................................. 455/456.1; 455/419
(58) Field of Classification Search .............. 455/456.1, 455/456.4, 456.3, 418, 419, 432.3
See application file for complete search history.

(56) References Cited

U.S. PATENT DOCUMENTS

| 6,343,213 | B1 * | 1/2002 | Steer et al. | 455/411 |
| 6,505,058 | B1 * | 1/2003 | Willey | 455/574 |
| 6,643,517 | B1 * | 11/2003 | Steer | 455/456.4 |
| 7,400,891 | B2 * | 7/2008 | Aaron | 455/456.4 |
| 2003/0073427 | A1 * | 4/2003 | Geck et al. | 455/411 |
| 2004/0082346 | A1 * | 4/2004 | Skytt et al. | 455/456.3 |
| 2004/0166873 | A1 * | 8/2004 | Simic et al. | 455/456.1 |
| 2005/0147073 | A1 * | 7/2005 | Hietalahti et al. | 370/338 |
| 2005/0277428 | A1 * | 12/2005 | Brown | 455/456.3 |

* cited by examiner

*Primary Examiner*—George Eng
*Assistant Examiner*—Michael Faragalla
(74) *Attorney, Agent, or Firm*—Moffat & Co.

(57) ABSTRACT

A method, apparatus and system for applying feature controls to features on a wireless device while the mobile is in a geographic area is provided. The wireless device receives instructions from a wireless network indicating which feature controls to apply. The wireless device determines that its position is within the geographic area and applies the feature controls.

22 Claims, 10 Drawing Sheets

GEOGRAPHICAL NETWORK INITIATED WIRELESS DEVICE FEATURE CONTROL

TECHNICAL FIELD

The patent application relates generally to control by a wireless network of wireless device features in geographical locations.

BACKGROUND

Wireless devices, such as mobile phones and personal digital assistants (PDAs), today have many features. Examples of some features include cameras, real time video, ringer adjustment, sms/mms, data and/or voice generalized communication, and capability to turn of various modes of device communication such as cellular air interface/IrDA/Bluetooth/USB etc. Certain facilities (e.g. business/government/private), may attempt to control the usage of these features by asking users to turn off the devices, or installing hardware that can control the features while the wireless device is within the geographical area under the control of the establishment.

Existing systems require hardware, such as a local transmitter or a Bluetooth beacon, to be physically located at the site where the features of the wireless device are to be disabled. The wireless device also requires additional hardware and/or software to interface to the on-site additional hardware in order to receive the control information to disable a feature on the wireless device.

For example, the Safe Haven™ product combines hardware transmitters with a small piece of control software loaded into a camera phone handset. When the handset is taken into a room or building containing the Safe Haven™ hardware, the phone is instructed to deactivate the imaging systems. The systems are reactivated when the handset is out of range. These types of systems require after market and voluntary installation, and additional capital outlay.

BRIEF DESCRIPTION OF THE DRAWINGS

Embodiments will now be described in greater detail with reference to the accompanying drawings, in which.

DETAILED DESCRIPTION OF THE PREFERRED EMBODIMENTS

The present application provides a method comprising: a wireless device receiving a message from a wireless network indicating that a feature control applies in a geographic area; the wireless device determining that the wireless device is in the geographic area; and the wireless device applying the feature control to a feature on the wireless device.

The present application further provides a method comprising: a wireless device receiving instructions to apply a feature control to a feature on the wireless device if it connects to a wireless network, said wireless network defined by a geographic area; and the wireless device applying the feature control to the feature upon connecting to the wireless network.

The present application further provides a system comprising: a wireless network defining a geographic area, said wireless network configured to send a message to a wireless device indicating that a feature control applies in the wireless network; the wireless device configured to determine that the wireless device is in the wireless network, to receive the message from the wireless network, and to apply the feature control to the feature.

The present application further provides a system comprising: a wireless network configured to send a message to a wireless device indicating that a feature control applies in a geographic area; the wireless device configured to receive the message from the wireless network, to determine that the wireless device is within the geographic area and to apply the feature control to the feature.

Other aspects and features will become apparent, to those ordinarily skilled in the art, upon review of the following description of the specific embodiments of the invention.

The inappropriate use of wireless device features, such as application capabilities in certain geographic areas, currently cannot be prevented by anything other than physical means. It is desirable that the feature of a wireless device be controllable at the wireless network level.

Figure 1:
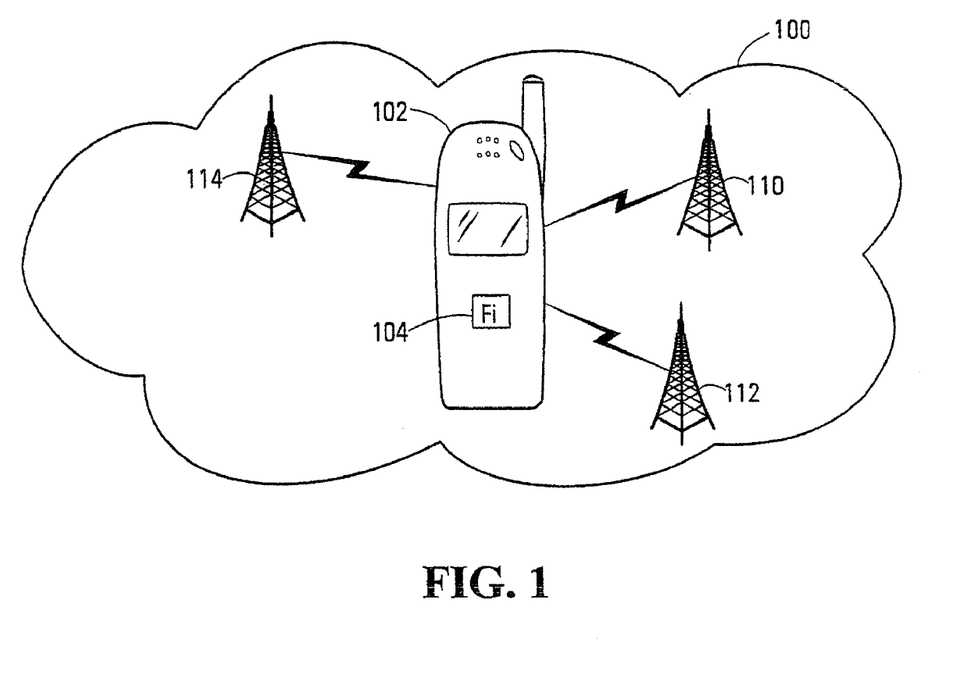
FIG. 1 is a diagram of a wireless device with feature controls within a wireless network.

FIG. 1 is a diagram of a wireless network 100 which covers smaller and well defined a geographic area. A wireless device 102 is shown within the area of the wireless network 100. The wireless device 102 has feature $F_i$ 104, where i=1 to n and n is a total number of features, which can be controlled within the wireless network 100. Also shown are base stations 110, 112, 114 through which the wireless device 102 communicates with the wireless network 100. Three base stations are shown. However, various embodiments can have any number of base stations.

In operation, the wireless device 102 contains instructions that a feature control applies to feature $F_i$ 104 while in the geographic area of the wireless network 100 and the wireless device will apply that control while it is in the geographic area of the wireless network 100. In some embodiments, the wireless device 102 receives instructions from the wireless network 100 through a base station 110, 112 or 114 upon entering the geographic area of the wireless network 100 to control feature $F_i$ 104.

In some embodiments the wireless network is a LAN (Local Area Network).

Since LANs are inherently a geographically local network, once a LAN is entered, the LAN itself may implement End User feature controls at the LAN packet data protocol level for wherever the wireless device is in that LAN's coverage.

An example is where a military 802.11 campus network would deny camera phone usage while in that 802.11 network's coverage. In another embodiment, the wireless device 102 has a database with a list of which features controls to apply in a list of LANs, cellular networks, etc., and the feature controls are applied automatically on entering the LAN, cellular network, etc. In the LAN embodiment the feature controls are linked to an SID (System Identifier) of the LAN in some embodiments. The Service Set Identifier (SSID) used in the IEEE 802.11 wireless local area network standards is one example of a SID. This list may be provisioned by a wireless operator via a different bearer path or configured before the device is sold and could subsequently be controlled by over the air messages or taking the device to have it changed somewhere. An example is dual mode 802.xx/cellular devices, where the wireless operator configures the LAN vs. feature control list.

Examples of features 104 that can be controlled are: a transmitter that can be turned on or off; ringer volume that can be adjusted; and a camera that can be enabled or disabled.

Figure 2:
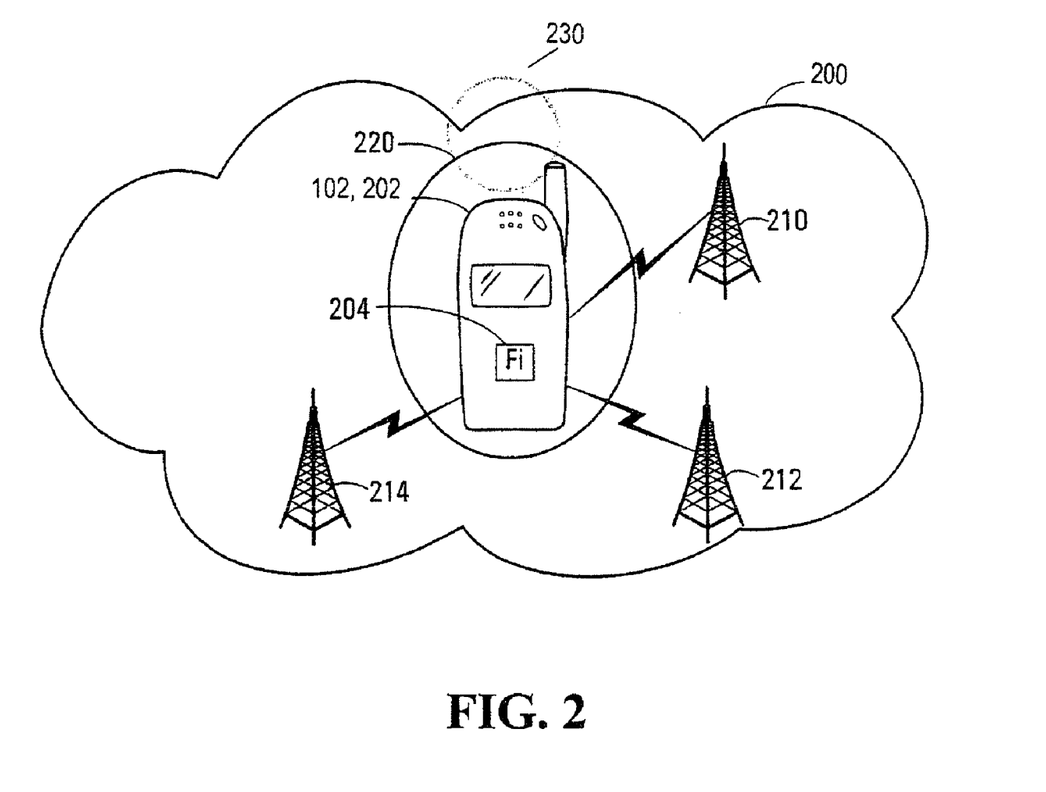
FIG. 2 is a diagram of a wireless device with feature controls within a geographic area within a wireless network.

FIG. 2 is a diagram of a wireless network 200 within which a geographic area 220 is shown. A wireless device 202 is shown within the geographic area 220. The wireless device 202 has feature $F_i$ 204, where i=1 to n and n a total number of features, which can be controlled while the wireless device is within the geographic area 220 based on instructions from the wireless network 200. Also shown are base stations 210, 212, 214 through which the wireless device communicates with the wireless network. Three base stations are shown.

However, various embodiments can have any number of base stations.

In operation, the wireless device 202 receives a message from the wireless is network 200 through a base station 210, 212 or 214 indicating that a feature control applies to feature $F_i$ 204 within the geographic area 220. When the wireless device 202 enters into the geographic area 220, it applies the feature control.

The wireless device 202 uses any position/location technology available to determine whether it is in the geographic area 220. Non-GPS (Global Positioning System) based technologies include AFLT (Advanced Forward Link Trilateration) in CDMA (Code Division Multiple Access) and E-OTD (Enhanced Observed Time Difference) in GSM. The wireless device may be able to compute the location by itself or it can send the measurements to the wireless network 200 which computes the location. Other possibilities include stand-alone GPS, where the wireless device locates itself by using its own stand-alone GPS receiver without any assistance from the wireless network and A-GPS (Assisted GPS), where the wireless network assists the wireless device 202 to perform GPS search in order to have a quick time to fix location. A-GPS technology has become mandatory within the United States due to Federal Communications Commission's (FCC) requirements on location accuracy during emergency calls. In some embodiments this technology is used by the wireless device 202 to determine accurately (defined in FCC (US Federal Communications Commission) requirements) the latitude, longitude, and height of the wireless device 202. This information is then used by the wireless device 202 to control feature $F_i$ 204 based on geographic location. The Location Services feature of CDMA is defined is TIA IS801, which is herein incorporated by reference.

In 3GPP (Third Generation Partnership Project for W-CDMA (GSM)), GSM (Global System for Mobile Communications) and GERAN (3GPP TSG (Technical Specification Group) for GSM/EDGE (Enhanced Data-rates for GSM Evolution) RAN (Radio Access Network)) support E-OTD, UMTS (Universal Mobile Telecommunications System) uses OTDOA (Observed Time Difference Of Arrival) and GERAN uses U-TDOA (Uplink Time Difference of Arrival), and all access technologies support cell coverage based positioning method and GPS positioning method. The Location Services feature of GSM and UMTS is defined in the 3GPP is Technical Specification 23.271, which is herein incorporated by reference.

In a further embodiment, the wireless device can use the cell identifier (cellid) to identifying a geographical area.

Other positioning technology can also be used. For example, GALILEO is a positioning standard that may be used in place of GPS. The present application is not meant to be limited by the positioning technology used.

In some embodiments the wireless network 200 is a wireless WAN (Wide Area Network). By way of example, a packet data enabled cellular network can be considered a WAN.

In another embodiment, a wireless device that is capable of both WAN and LAN connections can have a feature control that restricts access to certain LANs. Each LAN is a geographical area 230 that may be roamed to from the wireless network 200. The wireless device 102 has an account with the wireless WAN with an account profile that causes signaling from the wireless WAN over a signaling channel to the wireless device indicating that the wireless device is only permitted to connect to certain LANs with certain feature controls. In this embodiment, any type of WAN or LAN is possible. For example, the WAN can be 1 XRTT and the LAN can be 802.11.

Figure 3:
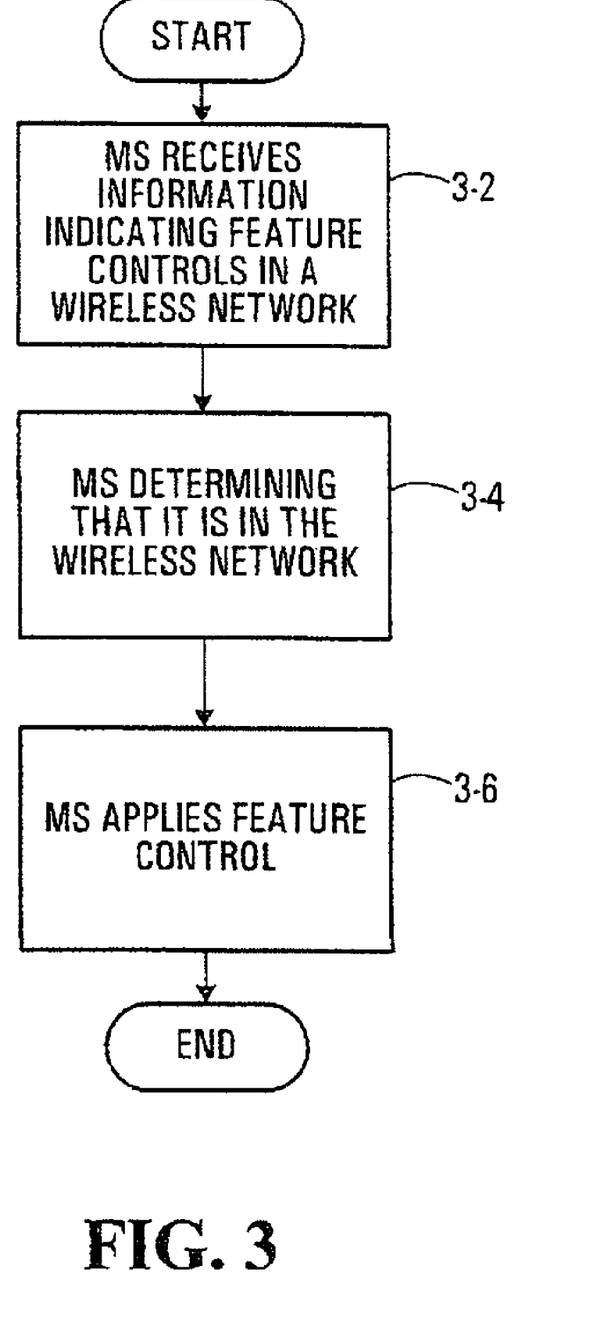
FIG. 3 is a flowchart of a method of controlling features of a wireless device within the wireless network of FIG. 1.

FIG. 3 is a flowchart of a method of implementing feature controls in the wireless network 100 of FIG. 1. The method begins with the wireless device 102 receiving information indicating that a feature control applies to feature $F_i$ 104 within the geographic area of the wireless network (Step 3-2). In some embodiments the information is in the form of a database, as discussed above, that is transferred to the wireless device on initialisation. This database could further be updated over time, with data added to or deleted from it. Next, the wireless device 102 determines that if the wireless device 102 is in the geographic area of the wireless network 100 (Step 3-4). In some embodiments this determining is achieved by the wireless device 102 receiving a SSID from a LAN is and cross-referencing the SSID against a list of SSIDs in a database on the wireless device 102. Next, the wireless device 102 applies the feature control to feature $F_i$ 104 (Step 3-6). In one embodiment, camera use may be prohibitted in a LAN, so the feature control to be applied would be to turn the camera feature off while in the area of the LAN.

Figure 4:
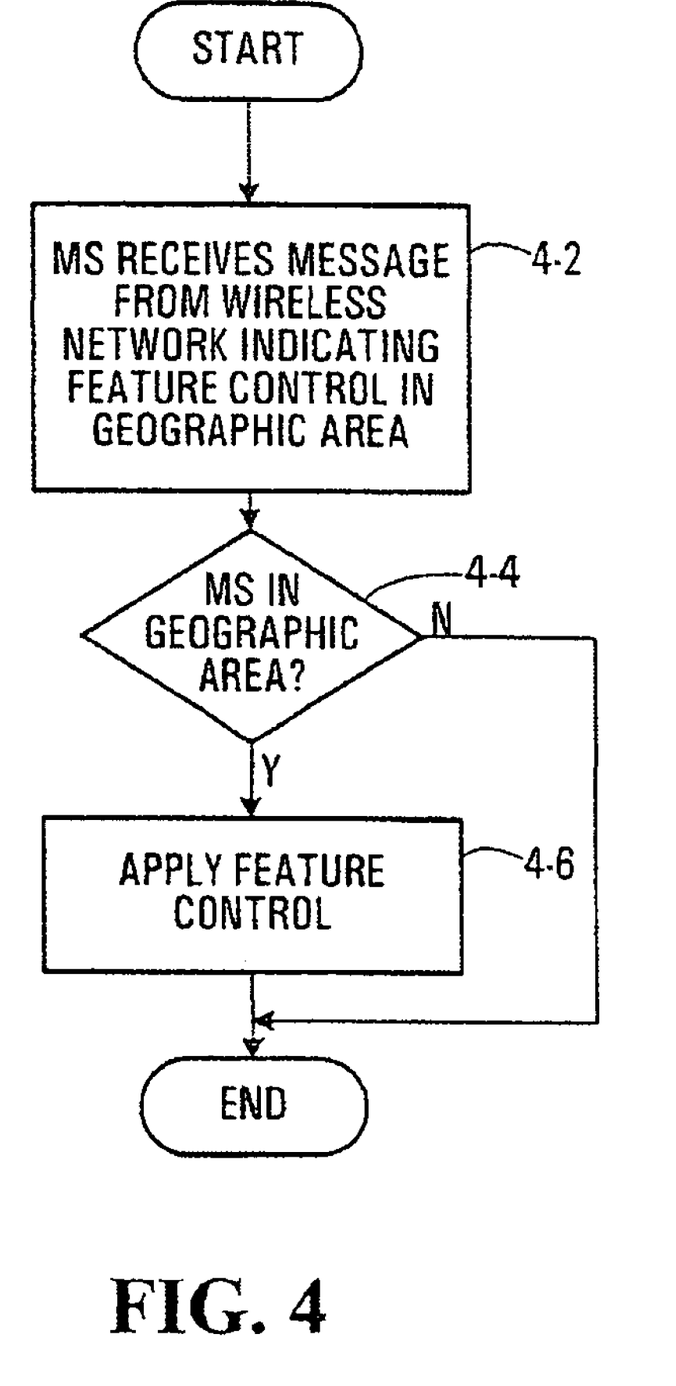
FIG. 4 is a flowchart of a method of controlling features of a wireless device within the wireless network of FIG. 2.

FIG. 4 is a flowchart of a method of controlling features $F_i$ 204 within the geographic area 220 within the wireless network 200 of FIG. 2. The method begins with the wireless device 202 roaming into network segment 220 and receiving a protocol level message from the wireless network 200 indicating that a feature control is to be applied within the broader geographic network segment 220. The protocol level message includes precisely defined geographic coordinates that are within network segment 220 (Step 4-2). This network segment 220 may be a cellular basestation, a sector, larger entities 3GPP2 entities such as registration zones and packets zones, larger 3GPP entities such as Routing Areas and Location Areas, or any other such similar operator defined divisions. In some embodiments, this message is part of a system configuration message sent on a control or beacon channel. Next, the wireless device 202 determines if the wireless device 202 is within the precisely defined geographic area 220 (Step 4-4). Any position location techonology may be used. If the wireless device 202 is in the geographic area 220 and within the precisely defined geographic coordinates, the feature control is applied to the feature $F_i$ 204 (Step 4-6). If the wireless device 202 is not within the precisely defined geographic coordinates within the geographic area 220, the method ends. This method can be repeated periodically, as the wireless device 202 moves from one geographic area to another.

Figure 5:
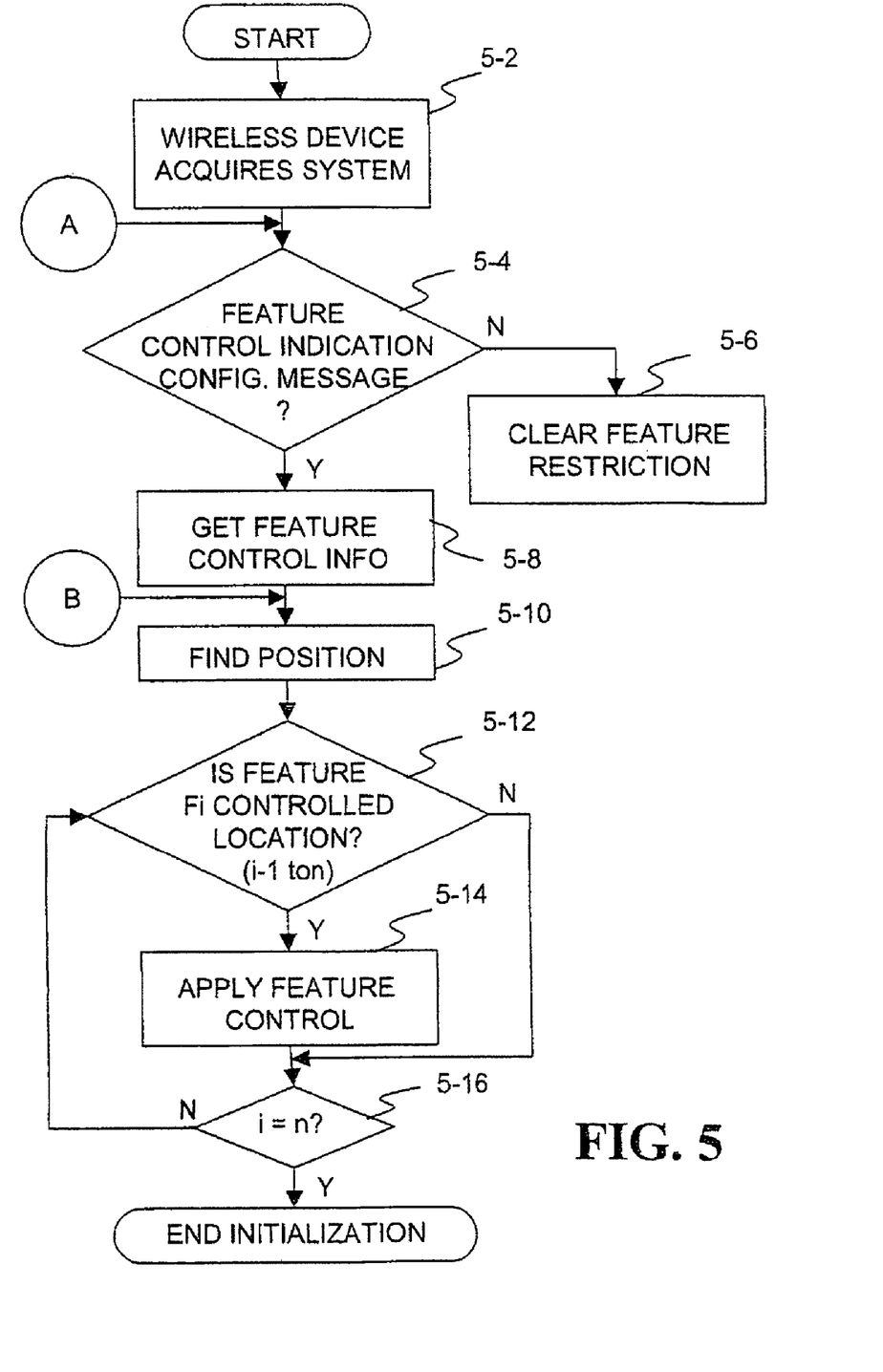
FIG. 5 is a flowchart of an embodiment of a method for initialising a wireless device within a WAN where geographic feature controls apply.

FIG. 5 is a flowchart of the initialisation of a wireless device with geographic feature controls within a wireless WAN. In the first step the wireless device acquires the system (Step 5-2). This includes receiving a configuration message from the wireless WAN. In some embodiments the configuration message is sent on a control or beacon channel. The configuration message will indicate whether or not feature controls are to be applied (Step 54). If no feature controls are indicated in the configuration message, feature controls on the wireless device are cleared (Step 5-6).

If feature controls are indicated in the configuration message, the wireless device will acquire feature control information for each feature that may be controlled from the wireless WAN (Step 5-8). Alternatively, the feature control could already be stored in the wireless device. In some embodiments, the feature control information includes the feature name $F_i$, where i=1 to n and n is the total number of features, feature control, co-ordinates of area where the feature control applies with some accuracy (for example, latitude and longitude and an error radius) and algorithms. Examples of algorithms include algorithms to deal with a cell smaller that the accuracy, hysteris or out of coverage behaviour. In some embodiments, the feature control information is received via a broadcast SMS (Short Message Service) which sends the information to all wireless devices on a particular control channel. In other embodiments, the wireless device gets the feature availability information over an IP connection. One embodiment this could be PPP/PDP (Point-to-Point Protocol/Packet Data Protocol) as IP (Internet Protocol) transport. Another embodiment could be a proprietary protocol.

Next, the wireless device will determine a current position of the wireless device (Step 5-10). This is done using any available position location technology, such as those discussed above with reference to FIG. 2. The wireless device will then check to see if feature $F_i$ is controlled at the current position (Step 5-12). If the feature is not controlled, the wireless device will check the next feature until all of the features have been checked (i.e. until i=n) (Step 5-16). If the feature $F_i$ is controlled at the current position, the feature control is applied by the wireless device (Step 5-14) and the next feature is checked until all of the features have been checked.

Figure 6:
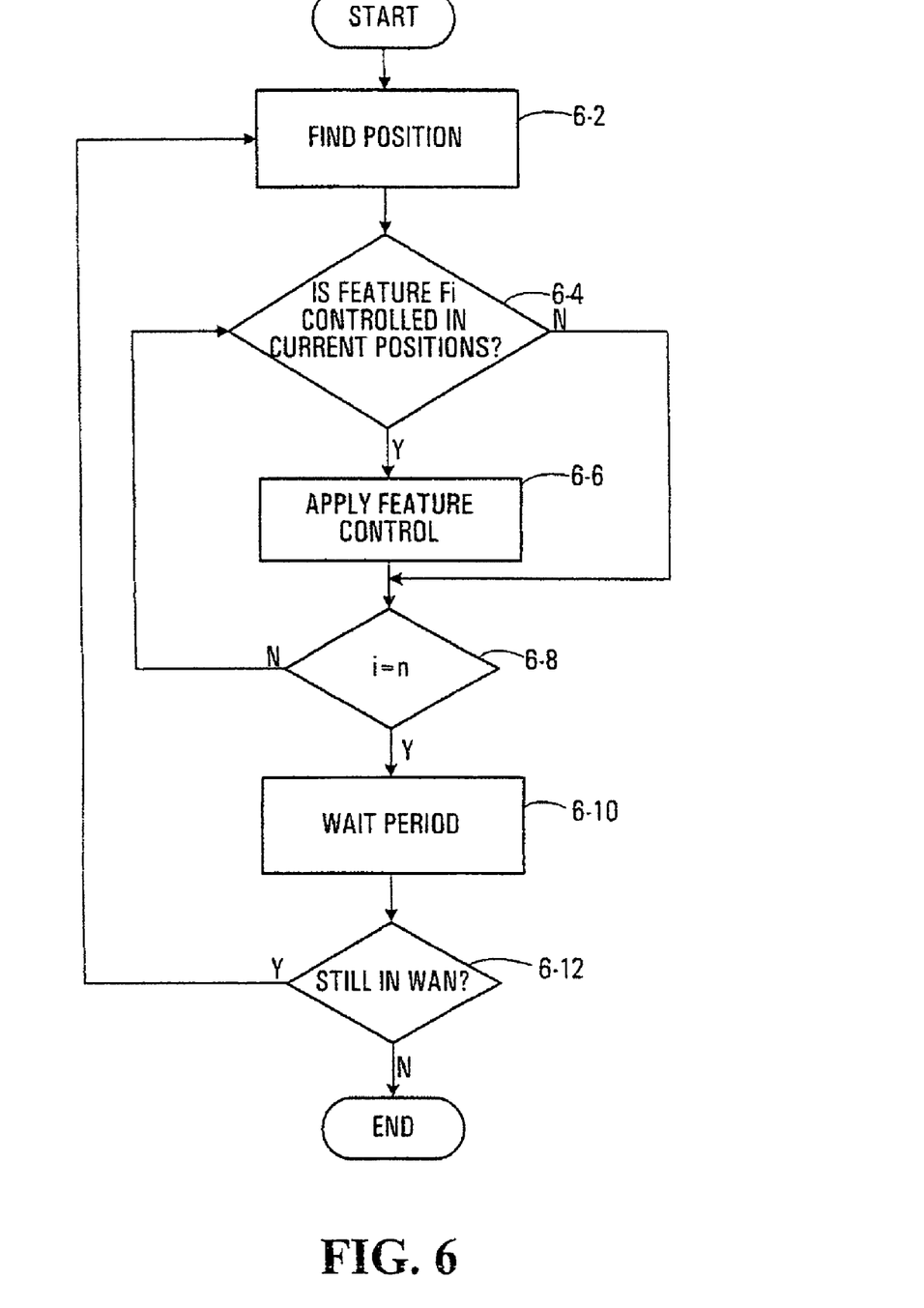
FIG. 6 is a flowchart of a method of periodically checking the position of a wireless device within a WAN where geographic feature controls apply.

FIG. 6 is a flowchart of a method of periodically checking the position and control features of the wireless device within a WAN after the initialisation of FIG. 5 has been completed. First the wireless device finds the current position of the wireless device (Step 6-2). The wireless device will then check to see if feature $F_i$ is controlled at the current position (Step 6-4). If the feature is not controlled, the wireless device will check the next feature until all of the features have been checked (i.e. until i=n) (Step 6-8). If the feature $F_i$ is controlled at the current position, the feature control is applied by the wireless device (Step 6-6) and the next feature is checked until all of the features have been checked. Once all of the features have been checked, the wireless device will wait until it is programmed to check the position again (Step 6-10). The wireless device will then determine if the wireless device is still in the wireless WAN (Step 6-12) and if so the wireless device will repeat the above steps starting at Step 6-2. If the wireless device is no longer in the WAN the method ends.

Figure 7:
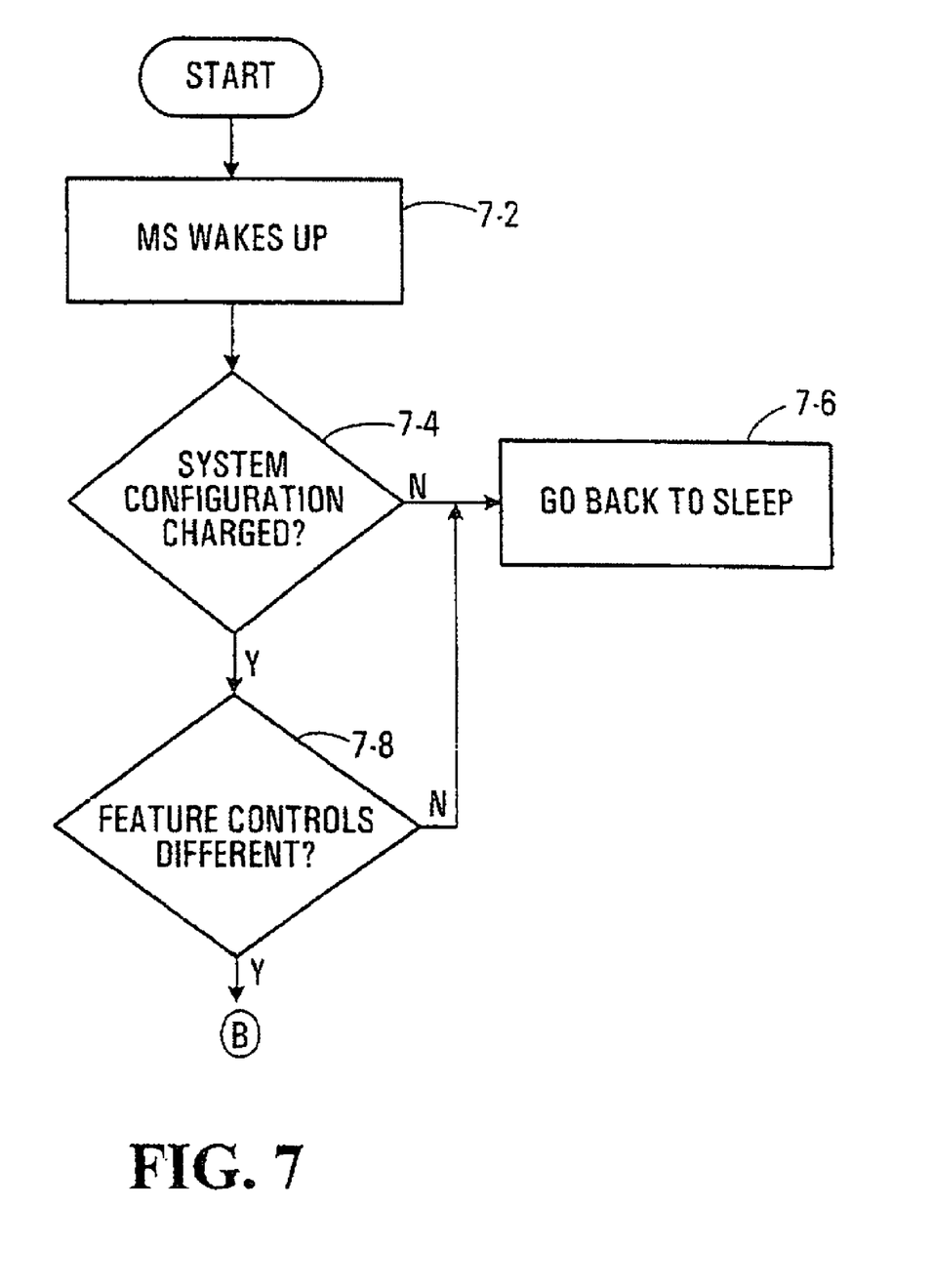
FIG. 7 is a flowchart of a method of idle handoff from one segment of a wireless network to another segment of a wireless network in which geographic feature controls apply.

FIG. 7 is a flowchart of an idle hand-off of a wireless device from one wireless WAN to another wireless WAN (for example PPP or PDP established, but no data being transferred) where geographic feature controls are to be applied. The method starts with the wireless device waking up from a sleep state (Step 7-2). Next, the wireless device checks to see if a system configuration for a change indicating that the wireless device has entered a new segment of the wireless WAN (Step 74). If there is no change, the wireless device will go back to sleep (Step 7-6). If there has been a system change, the wireless device will check.to see if the feature controls are different from those currently applied (Step 7-8). If the feature controls are the same as those from the previous wireless WAN, the wireless device will go back to sleep. If the feature controls have changed the wireless device will continue with the steps of FIG. 5, starting at point B. In some embodiments, changes in the feature controls are tracked by storing a feature control sequence number on the wireless device. Therefore, at step 7-8, the wireless device would only need to check if the feature control sequence number is different and would not need to check each feature control.

Figure 8:
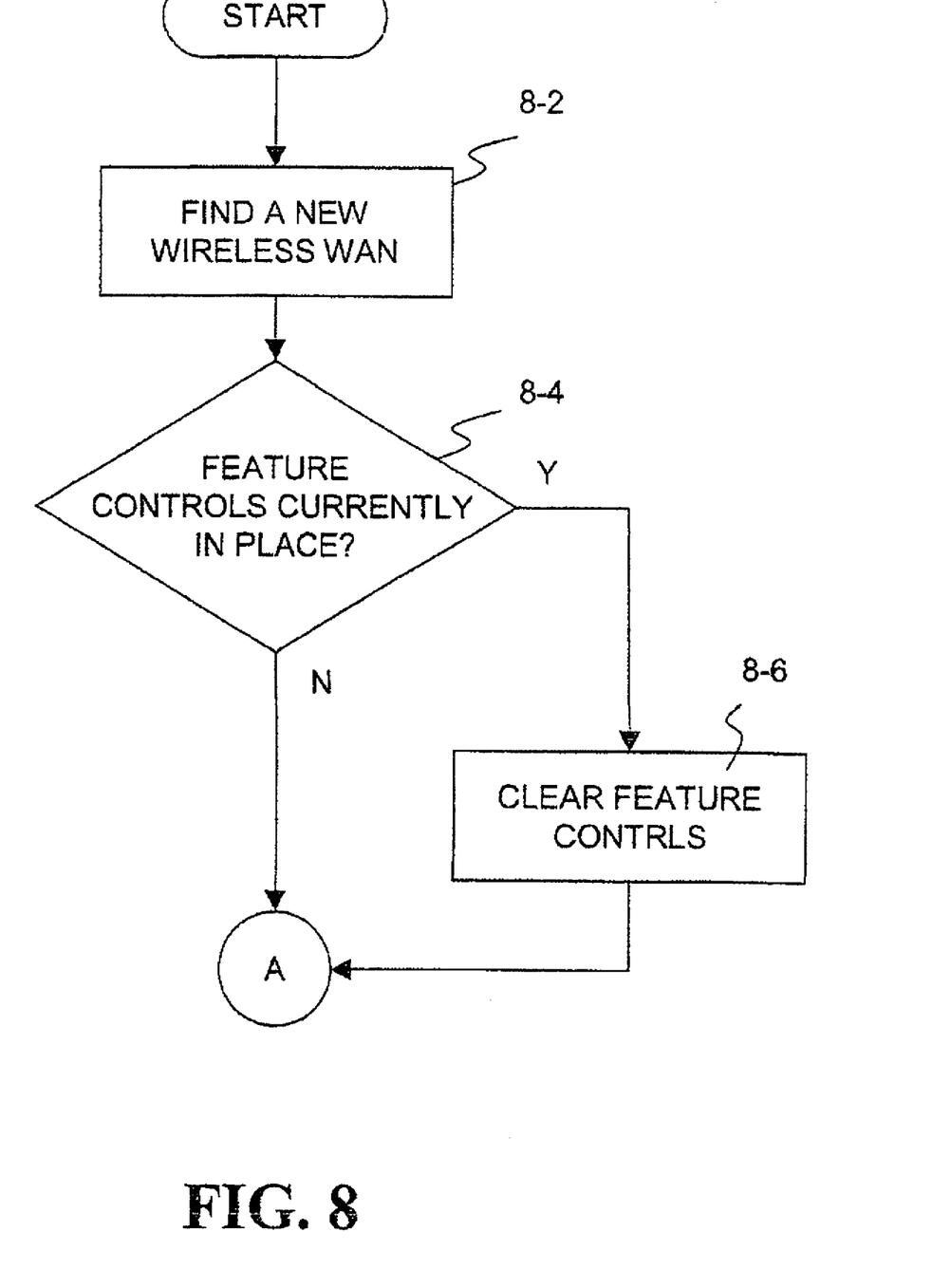
FIG. 8 is a flowchart of a method of active hand-off from one wireless network to another wireless network where geographic feature controls apply.

FIG. 8 is a flowchart of an active hand-off (for example actively transferring data in a call) of a wireless device with geographic feature controls from one wireless WAN to another wireless WAN. The method starts with the wireless device finding a new wireless WAN segment (e.g. a BTS ) (Step 8-2).

The wireless device will then check to see if any feature controls are currently in place (Step 8-4). If there are any feature controls in place, the wireless device will clear the feature controls (Step 8-6) and then proceed with the steps of FIG. 5 starting at point A. If there were no feature controls in place from the previous WAN, the wireless device will proceed with the steps of FIG. 5 starting at point A.

Figure 9A:
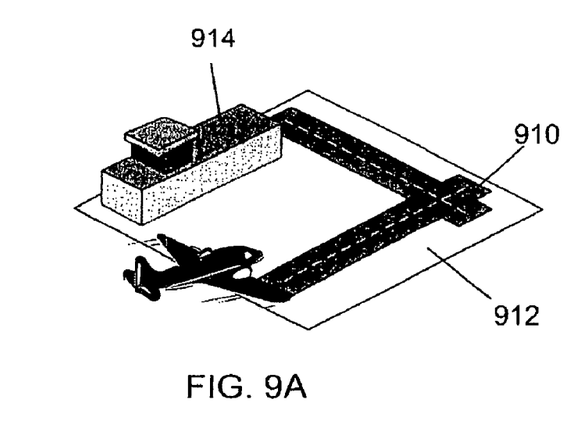
FIG. 9 is a block diagram of an exemplary bounding box scenario at an airport.

Reference is now made to FIG. 9. FIG. 9 illustrates one embodiment of the present method and system in which bounding boxes are used to identify various areas within which the mobile device can or cannot be used. For example, as seen in FIG. 9A, the runway of an airport can be considered to be an area where communication should be disabled. In this case, runway 910 could be considered a "red zone" and the featured control of the present method and system could ensure that communication is disabled from the mobile device when in the zone.

Other airport grounds, designated using reference numeral 912, could be considered to be a "yellow zone". In these areas, a user may or may not be able to use the mobile device. Specifically, if the user is going from a red zone into a yellow zone, the mobile device feature control will prohibit the user from communicating or using a specific feature in that zone.

The terminal building in FIG. 9A, designated using reference numeral 914, could be considered a "green zone". The feature control would allow features to be used within the green zone. Further, if a mobile device moves from the green zone into the yellow zone then the features are still enabled within the yellow zone.

Figure 9B:
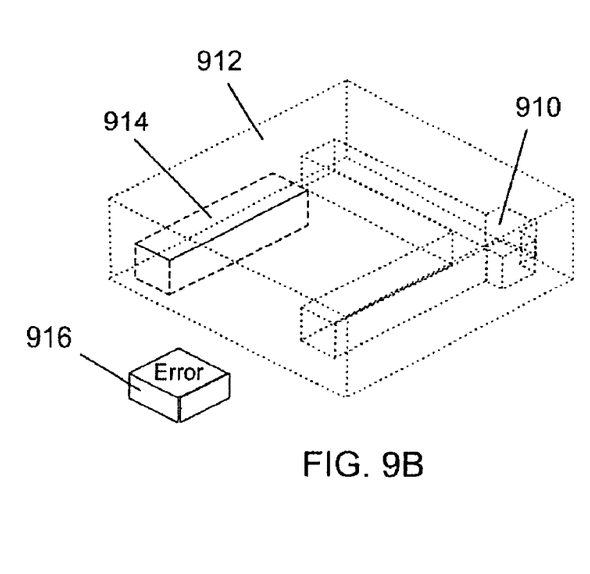

Referring to FIG. 9B, a bounding box view of the trigger zones is shown.

In this case, box 916, marked "Error" shows a region around the mobile device in which the mobile device could be located. As will be appreciated by those skilled in the art, the size of box 916 will depend on the accuracy available for the geographic location determination for the mobile device. If any portion of the box 916 enters a "red zone", then feature controls will disable various features based on the requirements of the red zone. Various algorithms that would be known to those skilled in the art could be used for this, including collision detection algorithms to determine when box 916 collides with a zone.

Figure 10:
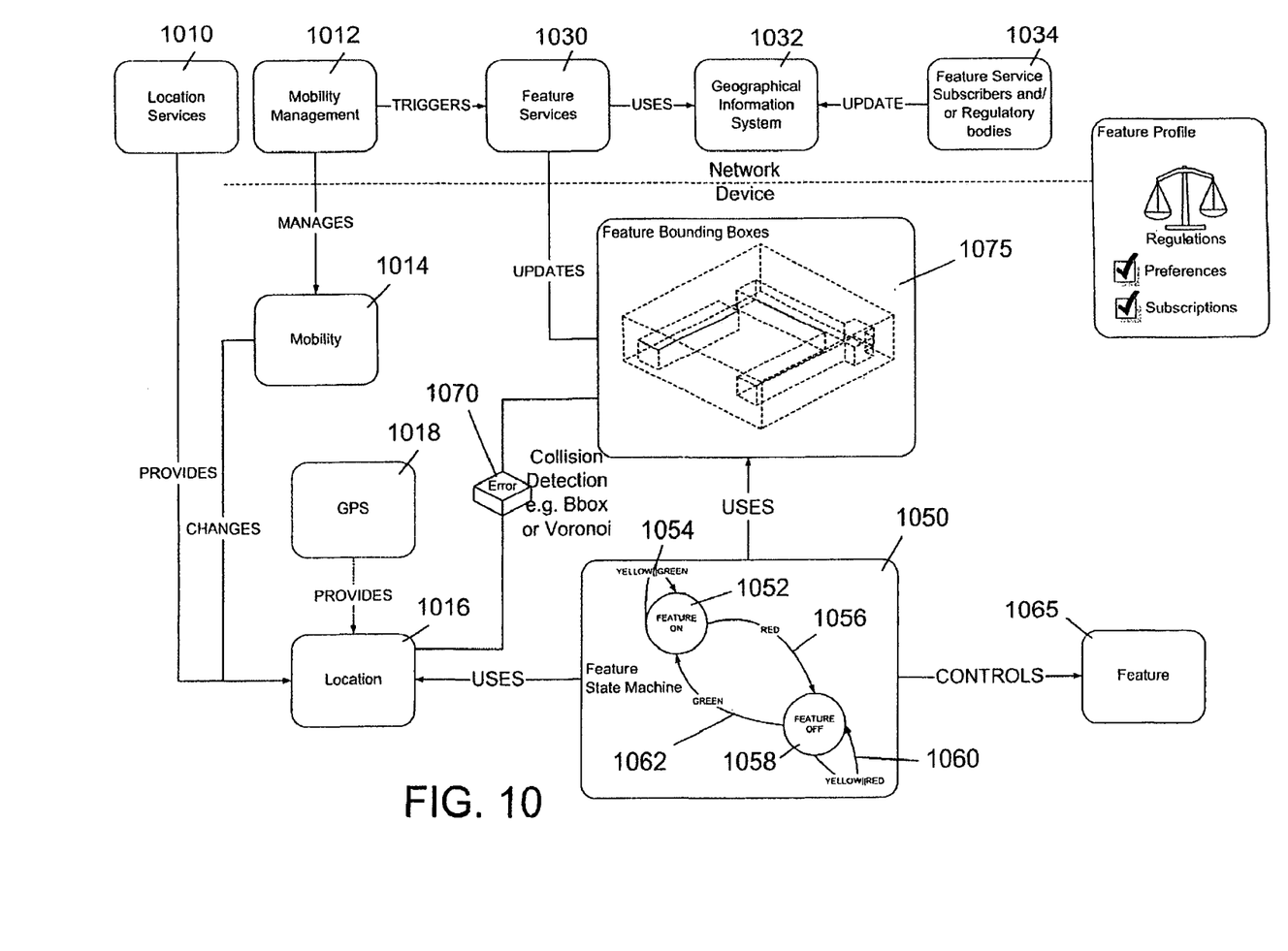
FIG. 10 is a flowchart showing feature control using bounding boxes.

Reference is now made to FIG. 10. FIG. 10 illustrates the concept of bounding boxes with regard to both the network and the mobile device.

Specifically, the network could include location services 1010 to provide the mobile device with a location. Further, mobility management 1012 occurs on the network side and could include, for example, cell changes, packet zone changes or other mobility criteria that would be known to those skilled in the art.

The mobile device includes a mobility module 1014 that communicates with mobility management 1012 and this mobility module can change the location identification 1016 of the mobile device. The location identification can be provided from location services 1010, or alternatively from a location module such as a GPS module 1018 as identified in FIG. 10.

In one embodiment, mobility management module 1012 triggers feature services 1030. Specifically, when a mobile device changes cells or packets, for example, then features and geographical locations in which those features are restricted could be loaded to the mobile device at that time. As will be appreciated by those skilled in the art, this will save resources required for storing features and geographical locations on the mobile device. The mobile device will need to only hold the feature services and geographic information for a particular cell.

Feature services 1030 use a geographic information system to identify which features are allowed and not allowed in various bounding boxes. Geographic information system 1032 could be updated through either feature service subscribers and/or regulatory bodies. For example, in the case of airports the federal aviation administration may restrict where certain services or features on a mobile device are allowed to be used. In alternative embodiments, subscribers to mobile services may wish to restrict certain features on their premises. For example, a movie theatre may wish to restrict the use of voice calls in any of its theatres. A gym may wish to restrict the use of camera features in the changing room areas or even in the entire gym complex. As will be appreciated, these feature service subscribers can pay a fee to a carrier to ensure that these features are restricted in these areas. This feature service subscriber information is shown in FIG. 10 as box 1034.

On the mobile device, once the mobile device knows its location, a State Machine 1050 can be used on the mobile device to determine whether a feature can be used. In State Machine 1050, if the mobile device is in a green zone it will be in a feature-on state 1052. If the mobile device then moves into a yellow zone, as illustrated by arrow 1054, the feature stays on. However, if the mobile device moves into a red zone as illustrated by arrow 1056, the mobile device moves to state 1058 in which the feature is turned off.

From state 1058, if the mobile device moves into a yellow zone, as depicted by arrow 1060 the feature remains off. However, if the mobile device moves into a green zone as depicted by arrow 1062 the feature turns back on in state 1052.

As illustrated in FIG. 10, state machine 1050 controls the feature 1065 and determines whether the feature 1065 is on or off.

Since the location may not be known precisely, an error box 1070 can be calculated for the mobile device and this error box can be used to compare to bounding boxes 1075 to see if any portion of the error box enters into a feature control area.

Feature bounding boxes 1075 are updated from the network through feature services module 1030 and can be changed whenever the mobile device changes cells, packet zones or performs other mobility changes.

Various algorithms can be used to detect whether the error box 1070 crosses into a feature control area in feature bounding boxes 1075. These could include a collision detection algorithm or a voronoi algorithm, among others. As will be appreciated by those skilled in the art, the above notion of bounding boxes allows feature control when imprecise knowledge of the location is available. Specifically, since the mobile device cannot know exactly where it is but can only define where it is based on an error box 1070, if this error box crosses into a boundary where feature control is either required due to regulation or desired by a service subscriber, the mobile device can prevent the feature from being used in that area.

In one embodiment, the mobile device could include an indicator that can be shown to a feature service subscriber to allow the mobile device to enter into an area. For example, a gym may restrict bringing cell phones into the change rooms unless the cell phone has a specific symbol indicating that it incorporates feature controls.

Various other examples of geographic wireless device feature control are:

1. Camera/real time video phones useage in private locations, such as the homes of wealthy or famous individuals looking for privacy, or public locations such as fitness centres, manufacturing floors, r&d labs etc. etc., and government locations, such as courts, hospitals, legislatures, defence establishments, law enforcement premises etc.;
2. Ringer adjustment, such as forcing discreet ringer volume in funerals or theatres and loud ringer volume in train stations and large public venues;
3. Disabling a phone's transmitter while in a restricted area such as on a tarmac in a plane or in a hospital;
4. Disabling or enabling any or all of voice/data/sms entirely within a geographic locale. For instance, if data capacity in a cell is very high, the carrier network may 'allow' only reduced rate modem service; and
5. Law enforcement applications such as geographic traps for 'bad' guys. For example, a target 'bad' guy subscriber enters a geographic trap area, such as a traffic bottle neck, like a highway, where there is a high likelyhood of target bad guys passing through a particular BTSs (Base Transceiver System) sector. The carrier network sends a broadcast message to all phones to do an exact position locate and secretly sends exact coordinates to the law enforcement agency on an ongoing basis. The positions of 'Bad' guys are thus identified in this trap.

In some embodiments, fields in the messages sent to the wireless devices by the wireless networks are sets including:

a standardised field indicating the version of the protocol being used;
optionally a length indicator byte;
a standardised byte to indicate end user 'features restricted';
a byte for a 'geo control flag' against each feature above to turn on or off;
'geographic coordinates' for each restricted end user features turned on;
'accuracy' code for each restricted end user features, representing a radius around the latitude and longitude that applies to restrict the feature. For A-GPS, a PDE (Position Determining Entity) provides the wireless device with some info about location uncertainty e.g. uncertainty in angle of axis with respect to True North. Similarly, the wireless device also includes its perceived errors such aspseudorange RMS (Root Mean Square) errorin the pseudorange measurement message to the PDE. These factors along with the number of GPS satellites seen by the wireless device, the, signal strength of each GPS satellite etc, can be taken into account to assess the location accuracy at the wireless device prior to making a decision;

'algorithms' which define a number of methods per disabled feature used by the phone to handle the restricted feature when network conditions alter.

For example, phone handoff in sectors smaller than the accuracy; conflicted settings in adjacent sectors with overlapping 'accuracy'; hysteresis of setting after handoff or before observing new feature control from the network; out of coverage behavior after receiving a feature control from the network (enable feature/keep disabled); allow mobile override of feature control (e.g. CDMA mobiles configured with certain Access Overload Class that can override any network control); and in cases where the GPS receiver is distinct from WAN/LAN receiver or in cases where a receiver may remain 'on' while a transmitter can be turned 'off', a device may be provided with preloaded coordinates that the device can use to turn the feature back on without a requirement for aid from the position determination entity or without the aid for intensive computation.

In some embodiments the wireless device has extra instructions in its executable file to implement the methods described above.

In some embodiments the geographical area does not necessarily require wireless coverage. For example, a basement gym may not have wireless network coverage. If a wireless device can act as a stand-alone GPS receiver without assistance from wireless network, once the wireless device computes a radial zone identified by latitude/longitude/height and radius, about a geographical area in which feature controls apply, while in coverage, the wireless device can use that information.

In another embodiment, certain features are automatically turned off if a certain condition is met. For example, a GPS fix is not possible and there is no wireless network coverage. This is effectively a negative implementation where the wireless device has been signalled to only turn off the feature when the condition is met. Other examples of conditions are the wireless device is no longer in RF coverage, or the wireless device is within particular geographic coordinates.

In a multimode air interface device, different modes of controlling features in geographic areas can be provided on the device.

| Feature | GPS | GSM/GPRS | WLAN | CDMA2000 |
|---|---|---|---|---|
| Camera (etc.) | Co-ordinates | CellID | Broadcast SSID | cellID |

The embodiments described above can be implemented on any channel or bearer path of communication. Examples of channel/bearer paths that can be used follow.

In CDMA the system parameter message (3GPP2, C.S0005-C_V.0 2.6.2.2.1. System Parameters Message) mandates wireless devices to store a variety of parameters, including base station latitude and longitude. There is also an optional feature called "User Zone" that identifies an area within which tiered is Services may be provided in a CDMA network. These parameters can be sent over a control channel or via an in-band signaling message on the traffic channel.

There are also proposals for 'Tracking Zones'.

There are mainly three types of location determination techniques in CDMA. These are i) A-GPS via PDE; ii) AFLT based on received pilots from base stations; and iii) hybrid of AGPS and AFLT. In some embodiments the wireless network provides notification to the wireless device where it will track it's own location and turn off/on features when geographically appropriate. In some embodiments this notification is SID wide. IS-801, herein incorporated by reference, defines messaging of location services in the form of Data Burst Messages as the transport. Same data burst messages can be exchanged over IP transport during a packet data call.

In GSM the Broadcast Control Channel (BCCH) or GPRS General Packet Radio Service) PBCCH (Packet Broadcast Control Channel) are used to broadcast cell specific information to the wireless device. This may include Latitude/Longitude of the Base Station. Also supported in GSM is the E-OTD positioning method, GPS positioning method and cell coverage positioning method. Also, USSD (Unstructured Supplementary Service Data) is a network/terminal feature that could be triggered when the terminal enters a specific area. Here, the wireless network will actually target the wireless device. Alternatively, the wireless device could solicit information from the wireless network using the USSD feature to ask what it should do. This might be useful if there is no location information available from GPS or A-GPS but you can still get service. For example, an in-building solution where there are pico cells but you can't see any GPS satellites. USSD could be also be implemented on a private wireless corporate network.

Wireless Mulitcast/Broadcast IP messages can also be used. Within 3GPP and 3GPP2 compliant standards, standards have been developed for subscription based IP broadcast and IP multicast services. IP broadcast is designed for broadcast of IP packets in small geographic areas, and the standard is built up to determine when small geographic areas are entered. A good example is entering a mall, people that are signed up for the broadcast service would receive streams of data trying to sell them something. In some embodiments a wireless device that support this standard may have a default subscription profile created for "Geographically Network Triggered Mobile Phone Feature Disablement". The infrastructure would perform IP broadcast to all subscribers in these small geographic areas, sending protocol level messages that are implemented according to the methods described above. These messages could implement IETF (Internet Engineering Taskforce) Vendor Specific Messages, such as RFC2153 PPP Vendor Extensions. Other RFCs (Requests for Comments) exist that can establish similar goals, depending on the protocol used. Within LAN (802.11) capable wireless devices, the LAN may apply feature controls at the pure IP application level, rather than the protocol level. An example is a WiFi network notification of what features are allowed on a dual WiFi/Cellular wireless device, covering only the case of entering a campus environment. A further example is a campus intranet, having a server to send the wireless device an indication of which features to turn off.

Alternatively, a normal data connection to an application on the wireless device that is specifically for determining the wireless device's location can be used, illustrating an application level implementation. For example in GPRS the wireless network establishes or the wireless device establishes a PDP Context between an application on the wireless device and a server providing LCS (Location Services) information.

The application downloads the co-ordinates of the mobile based on Cell-Id or one of the other available positioning methods.

In CDMA, the fields of the message with feature control information can be sent over the paging channel in the form of sector-wide system overhead message. In addition, these field can also be sent using point-to-point SMS or broadcast SMSA Service Category field in Broadcast SMS (IS-637) can be enhanced to provide information about "Restricted Zones and Services". In effect, extending service category assignments is analogous to an application level implementation over IP.

Alternatively, the feature control information can be included in one of the current sector-wide overhead messages on the relevant channels, such as PCH (paging channel) and BCCH. There will be a problem with PCS implementation that may not be palatable to base station folks. Usually, the size of fixed overhead messages is known, and the BTS paging scheduler operates based on that to decide when it can schedule mobile-specific messages. If it is dynamic, then it becomes complex.

It is preferable to use the above described methods and apparatus in a standards based network approach (e.g. 3GPP2/3GPP/OMA (Open Mobile Alliance)) for a mandatory wireless device feature that 'listens' to network instructions regarding what features are 'allowed' in particular geographic locations. Users would have no choice in whether the feature controls are applied, and physical locations would only need to subscribe to the service with their service provider, thus requiring no physical equipment. To be an effective 'undefeatable' feature, embodiments must be part of the signalling for the air interface technology.

In other embodiments, it is possible to implement the methods described above by adding software to the wireless device and without changing communication standards. For example an IP multi-cast or IP broadcast can be used.

There is also a revenue opportunity for wireless carriers. For example, an enterprise (for example a fitness club) could subscribe with a wireless carrier so that, within the enterprise's geographic location, the wireless carrier guarantees to turn off camera phones. The enterprise would pay a monthly fee for the service.

What has been described is merely illustrative of the application of the principles of the invention. Other arrangements and methods can be implemented by those skilled in the art without departing from the spirit and scope of the present invention.

The invention claimed is:

1. A method for geographical feature control in a wireless device operating in a wireless network, the wireless device having one or more controllable features, the method comprising at the wireless device:
   receiving a configuration message on a control or beacon channel, said configuration message including an indication that feature controls apply;
   responsive to the receiving, requesting feature control information from the wireless network, and acquiring the requested feature control information from the wireless network for each feature to which feature control is to be applied;
   determining, that the wireless device is in a geographic area as specified in the feature control information; and
   applying a feature control, based on acquired feature control information to a feature on the wireless device.

2. The method of claim 1 wherein the wireless network is a WAN (Wide Area Network).

3. The method of claim 1 further comprising:
   the wireless device obtaining a feature control configuration sequence number from the wireless network; and
   the wireless device storing the configuration sequence number in a memory on the wireless device.

4. The method of claim 1 further comprising the wireless device periodically determining the current location of The wireless device and turning off the feature control if the wireless device leaves the geographic area.

5. The method of claim 1, wherein the determining comprises the wireless device obtaining a current position from a (GPS (Global Positioning System).

6. The method of claim 1, wherein The determining comprises the wireless device obtaining a current position by AFLT (Advanced Forward Link Trilateration).

7. The method of claim 1, wherein The acquiring step includes receiving bounding boxes for regions where feature controls are to be turned on and regions where feature controls are to be turned off.

8. The method of claim 7, wherein the acquiring step further comprises:
   creating an error region for the wireless device;
   retrieving a bounding box for a region in which feature controls are to be implemented; and
   performing a comparison to determine whether the error region intersects with the bounding box in which a feature is to be turned off.

9. The method of claim 1 wherein the wireless network is a wireless LAN (Local Area Network).

10. The method of claim 1 wherein the acquiring is implemented during initialisation of the wireless device.

11. The method of claim 1 wherein the acquiring comprises receiving a list of wireless LANs (Local Area Networks) to which the wireless device is permitted to connect.

12. The method of claim 11, wherein the list of wireless LANs contains data regarding feature controls allowed for each wireless LAN.

13. The wireless device of claim 1 wherein the acquiring comprises receiving account information, said account information comprising a list of LANs (Local Area Networks) to which the wireless device is permitted to connect.

14. A wireless device configured to implement the method of claims 1.

15. A computer readable medium with computer readable instructions thereon for causing a wireless device to implement the method of claim 1.

16. A system comprising:
   a wireless network defining a geographic area, said wireless network configured to send a configuration message to a wireless device over a control or beacon channel, the configuration message including an indication that feature controls apply in the wireless network; and
   the wireless device configured:
      to determine that the wireless device is in the wireless network,
      to receive the configuration message from the wireless network over the control or beacon channel said configuration message including an indication that feature controls apply,
      responsive to the indication, to acquire feature control information from the wireless network infrastructure, and
      to apply the feature control from the acquired feature control information to a feature.

17. A system comprising:
a wireless network configured to send a configuration message to a wireless device over a control or beacon channel, the configuration message indicating that feature controls apply; and
the wireless device configured:
to receive the configuration message from the wireless network,
responsive to the indication;
to request feature control information from the wireless network, to acquire, the requested feature control information from the wireless network infrastructure,
to determine that the wireless device is within a geographic area defined by the feature control information, and
to apply the feature control to a feature.

18. The system of claim 17 further comprising a PDE (Position Determining Entity) as a component of the wireless network, said PDE configured to determine the position of the wireless device, wherein said wireless device communicates with said PDE to obtain the position of the wireless device.

19. The system of claim 18 wherein said PDE communicates with a GPS (Global Positioning System) satellite to determine the position of the wireless device.

20. The system of claim 18 wherein said wireless device is GPS (Global Positioning System) capable and determines that the wireless device is within the geographic area by obtaining a current position from a GPS satellite.

21. The system of claim 18 wherein said wireless network defines geographic areas as bounding boxes for feature control, and wherein said wireless device includes an error region for a location for the wireless device, said wireless device determining whether said error region intersects a bounding box for feature control.

22. The method of claim 1, wherein the acquiring step is performed over an IP connection or over a Short Message Service or a proprietary protocol.

* * * * *

UNITED STATES PATENT AND TRADEMARK OFFICE
CERTIFICATE OF CORRECTION

PATENT NO. : 7,653,398 B2 Page 1 of 1
APPLICATION NO. : 11/252726
DATED : January 26, 2010
INVENTOR(S) : Adrian Buckely et al.

It is certified that error appears in the above-identified patent and that said Letters Patent is hereby corrected as shown below:

Col. 11 line 62 in claim 1 "determining, that the wireless device is in" should have read
-- determining that the wireless device is in --.

Col. 12 lines 6-7 in claim 4 "The wireless device and turning off the feature control" should have read
-- the wireless device and turning off the feature control --.

Col. 12 lines 13-14 in claim 6 "The determining comprises the wireless device obtaining a current position" should have read -- the determining comprises the wireless device obtaining a current position --.

Col. 12 lines 16-17 in claim 7 "The acquiring step includes receiving bounding boxes for regions" should have read -- the acquiring step includes receiving bounding boxes for regions --.

Col. 12 lines 44-45 in claim 14 "A wireless device configured to implement the method of claims 1." should have read -- A wireless device configured to implement the method of claim 1. --.

Col. 12 lines 60-61 in claim 16 "beacon channel said configuration" should have read -- beacon channel, said configuration --.

Col. 13 line 9 in claim 17 "responsive to the indication;" should have read -- responsive to the indication: --.

Signed and Sealed this

Fourth Day of May, 2010

David J. Kappos
*Director of the United States Patent and Trademark Office*